US012202708B2

(12) United States Patent
Minami et al.

(10) Patent No.: US 12,202,708 B2
(45) Date of Patent: Jan. 21, 2025

(54) DYNAMIC LIFT-OFF CONTROL DEVICE, AND CRANE

(71) Applicant: TADANO LTD., Kagawa (JP)

(72) Inventors: Yoshimasa Minami, Kagawa (JP); Hiroshi Yamauchi, Kagawa (JP); Shohei Nakaoka, Kagawa (JP)

(73) Assignee: TADANO LTD., Kagawa (JP)

( * ) Notice: Subject to any disclaimer, the term of this patent is extended or adjusted under 35 U.S.C. 154(b) by 543 days.

(21) Appl. No.: 17/422,059

(22) PCT Filed: Feb. 14, 2020

(86) PCT No.: PCT/JP2020/005899
§ 371 (c)(1),
(2) Date: Jul. 9, 2021

(87) PCT Pub. No.: WO2020/166721
PCT Pub. Date: Aug. 20, 2020

(65) Prior Publication Data

US 2022/0098008 A1 Mar. 31, 2022

(30) Foreign Application Priority Data

Feb. 14, 2019 (JP) ................................ 2019-024610

(51) Int. Cl.
*B66C 13/06* (2006.01)
*B66C 23/90* (2006.01)

(52) U.S. Cl.
CPC .......... *B66C 13/066* (2013.01); *B66C 23/905* (2013.01)

(58) Field of Classification Search
CPC ..... B66C 13/066; B66C 23/905; B66C 23/36; B66C 23/701; B66C 13/063
See application file for complete search history.

(56) References Cited

U.S. PATENT DOCUMENTS 5,282,136 A 1/1994 Zui et al.
2011/0006024 A1* 1/2011 Schneider ............ B66C 13/063 212/272

FOREIGN PATENT DOCUMENTS

JP H01-256496 A 10/1989
JP H03-284599 A 12/1991
(Continued)

OTHER PUBLICATIONS

Kiviluoto, Sami et al. "Modelling and control of a vertical oscillation in overhead cranes" 2015 IEEE, American Control Conference (Year: 2015).*
(Continued)

*Primary Examiner* — Joan T Goodbody
*Assistant Examiner* — Godfrey Aleksander Maciorowski
(74) *Attorney, Agent, or Firm* — Paratus Law Group, PLLC

(57) ABSTRACT

The present invention provides a dynamic lift-off control device and a crane with which it is possible to quickly perform dynamic lift-off of a suspended load while suppressing vibration of the load. This dynamic lift-off control device D comprises: a boom (14); a winch (13); a load weight measurement means (22); and a controller (40) serving as a control unit, the controller (40) controlling operations of the boom (14) and the winch (13), deriving, when performing dynamic lift-off of the suspended load by hoisting the winch (13), an amount of change in a derricking angle of the boom (14) on the basis of the time change in the measured load weight, and raising the boom (14) so as to compensate for the amount of change.

6 Claims, 8 Drawing Sheets

(56) References Cited

FOREIGN PATENT DOCUMENTS

| | | | | |
|---|---|---|---|---|
| JP | H07-010469 | A | | 1/1995 |
| JP | H0710469 | | * | 1/1995 |
| JP | H08-188379 | A | | 7/1996 |
| JP | 2002-080189 | A | | 3/2002 |
| JP | 2010235249 | | * | 10/2010 |

OTHER PUBLICATIONS

Oct. 24, 2022, European Search Report issued for related EP Application No. 20755056.7.
Apr. 21, 2020, International Search Report issued for related PCT application No. PCT/JP2020/005899.
Apr. 21, 2020, International Search Opinion issued for related PCT application No. PCT/JP2020/005899.
Mar. 17, 2022, Indian Examination Report issued for related IN Application No. 202117030889.

* cited by examiner

CHANGE IN LOAD WEIGHT DATA ON AML AT THE TIME OF DYNAMIC LIFT-OFF CHECKING TEST

DYNAMIC LIFT-OFF CONTROL DEVICE, AND CRANE

CROSS REFERENCE TO PRIOR APPLICATION

This application is a National Stage Patent Application of PCT International Patent Application No. PCT/JP2020/005899 (filed on Feb. 14, 2020) under 35 U.S.C. § 371, which claims priority to Japanese Patent Application No. 2019-024610 (filed on Feb. 14, 2019), which are all hereby incorporated by reference in their entirety.

TECHNICAL FIELD

The present invention relates to a dynamic lift-off control device and a crane for suppressing vibration of a load when lifting a suspended load from the ground.

BACKGROUND ART

In a conventional crane provided with a boom, when a suspended load is lifted from the ground, that is, when dynamic lift-off of a suspended load is performed, a work radius increases due to deflection generated in the boom, so that "vibration of a load" in which the suspended load swings in a horizontal direction is a problem (see FIG. 1).

For the purpose of suppressing vibration of a load at the time of dynamic lift-off, for example, a vertical dynamic lift-off control device disclosed in Patent Literature 1 is configured to detect a rotation speed of an engine by an engine rotation speed sensor and correct raising operation of a boom to a value according to the engine rotation speed. With such a configuration, it is possible to perform accurate dynamic lift-off control in consideration of a change in engine rotation speed.

CITATION LIST

Patent Literature

Patent Literature 1: Japanese Patent Application Laid-Open No. H08-188379

SUMMARY OF THE INVENTION

Problems to be Solved by the Invention

However, in conventional dynamic lift-off control devices including the device of Patent Literature 1, two actuators are used in combination for control so as to wind up a wire with a winch by the amount of extension of the wire, and increase the derricking angle of the boom to keep the work radius constant. Therefore, there is a problem that dynamic lift-off takes time due to complicated control.

An object of the present invention is to provide a dynamic lift-off control device with which it is possible to quickly perform dynamic lift-off of a suspended load while suppressing vibration of the load, and a crane including the dynamic lift-off control device.

Solutions to Problems

In order to achieve the above object, a dynamic lift-off control device of the present invention includes:

a boom configured to be freely raised and lowered;

a winch that winds up and winds down a suspended load via a wire;

a load weight measurement means that measures a load weight acting on the boom; and a control unit that controls operations of the boom and the winch, derives, when performing dynamic lift-off of the suspended load by hoisting the winch, an amount of change in a derricking angle of the boom on the basis of the time change in the measured load weight, and raises the boom so as to compensate for the amount of change.

A crane of the present invention includes the above-described dynamic lift-off control device.

Effects of the Invention

According to the present invention, it is possible to quickly perform dynamic lift-off of a suspended load while suppressing vibration of the load.

DESCRIPTION OF EMBODIMENTS

Hereinafter, embodiments according to the present invention will be described with reference to the drawings. However, the components described in the embodiments below are merely examples, and the technical scope of the present invention is not intended to be limited thereto.

Examples of the crane to which a dynamic lift-off control device of the present invention can be applied include a rough terrain crane, an all terrain crane, and a truck crane. Hereinafter, in the present embodiment, a rough terrain crane which is a mobile crane will be described as an example, but the dynamic lift-off control device according to the present invention can also be applied to other cranes.

(Configuration of Mobile Crane)

First, the configuration of the mobile crane will be described with reference to a side view of FIG. 2.

Figure 1:
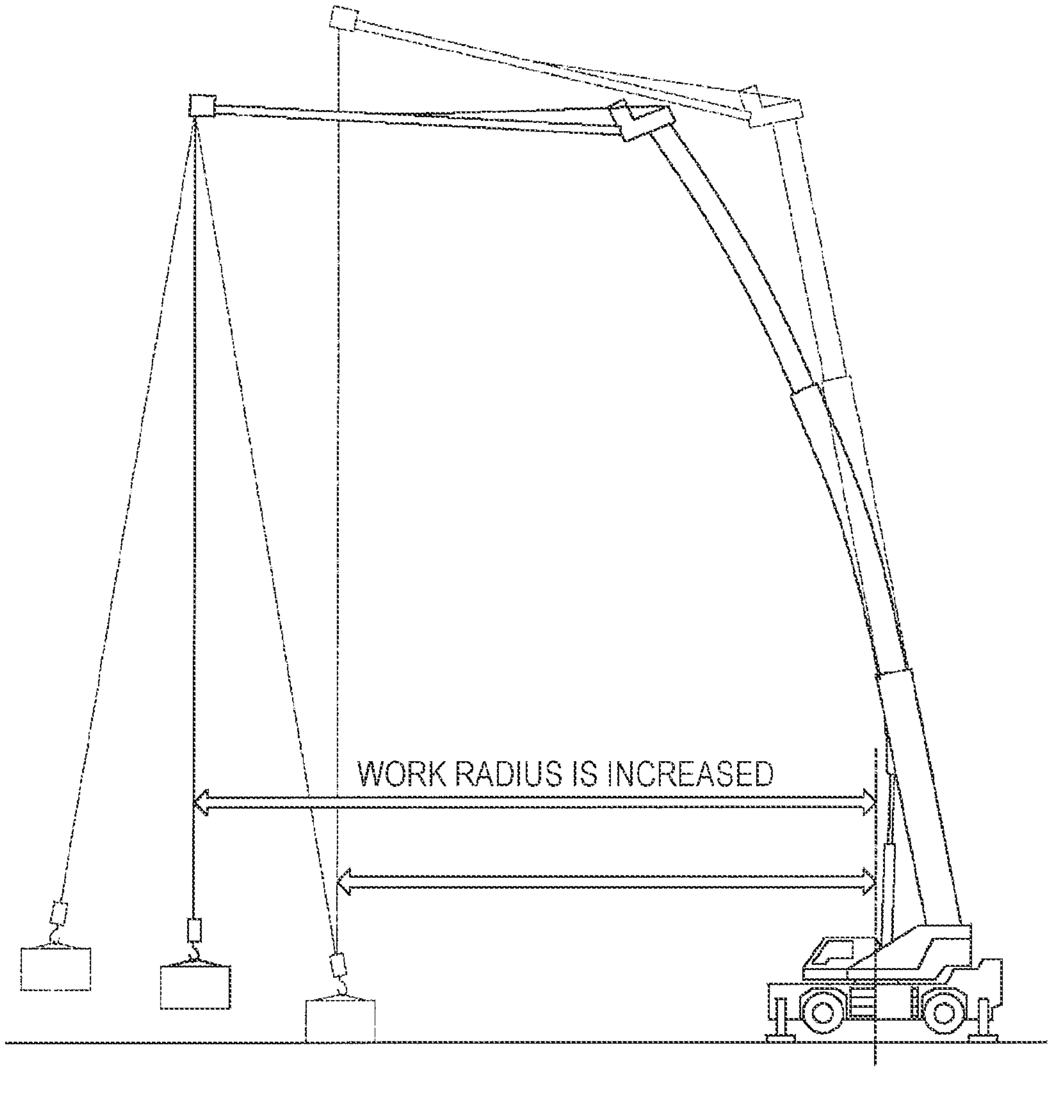
FIG. 1 is an explanatory view for explaining vibration of a suspended load.
Figure 2:
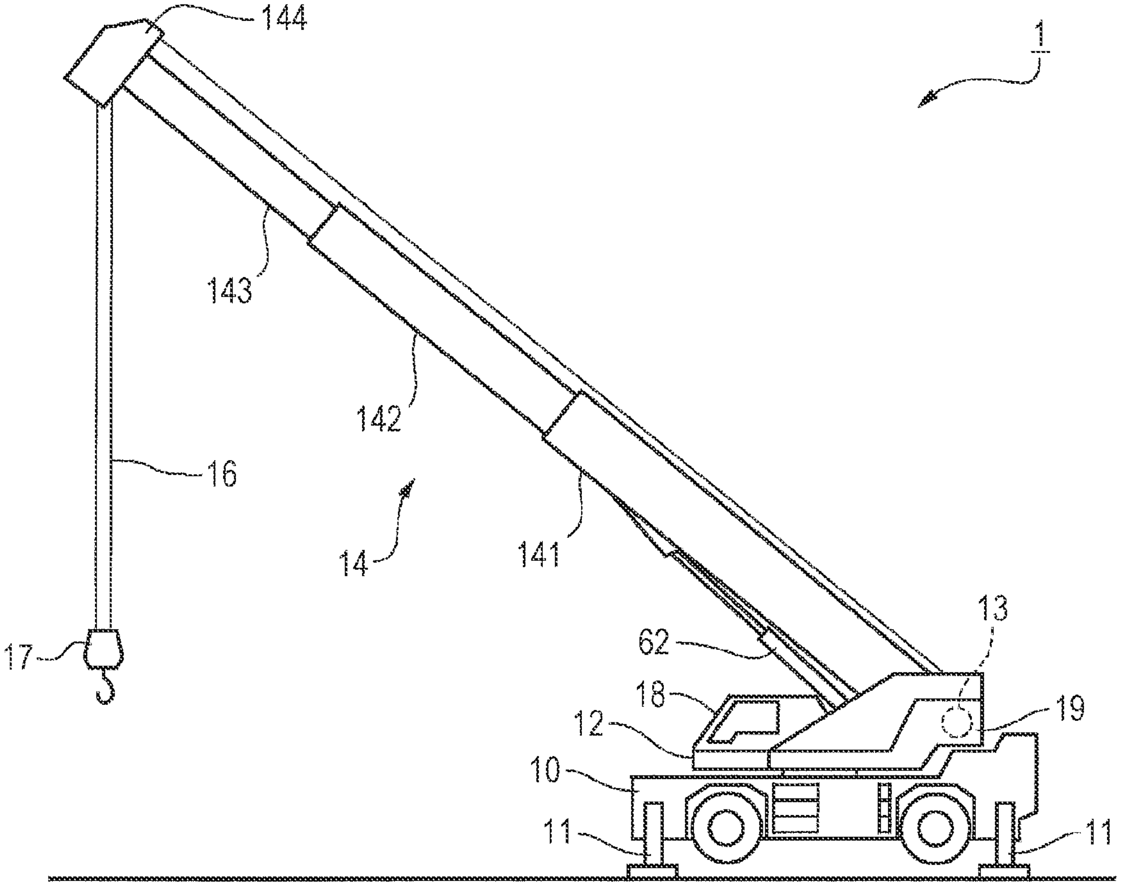
FIG. 2 is a side view of a mobile crane.

As illustrated in FIG. 2, a rough terrain crane 1 of the present embodiment includes a vehicle body 10 serving as a main body portion of a vehicle having a traveling function, outriggers 11, . . . provided at four corners of the vehicle body 10, a turning table 12 attached to the vehicle body 10 so as to be horizontally turnable, and a boom 14 attached to the rear of the turning table 12.

The outrigger 11 can be slidably overhung/slidably stored outward in the width direction from the vehicle body 10 by expanding and contracting a slide cylinder, and can be overhung/stored by a jack in the vertical direction from the vehicle body 10 by expanding and contracting a jack cylinder.

The turning table 12 includes a pinion gear to which power of the turning motor 61 is transmitted, and the pinion gear meshes with a circular gear provided on the vehicle body 10 to turn about a turning shaft. The turning table 12 includes an operator seat 18 disposed on the right front side and a counterweight 19 disposed on the rear side.

A winch 13 for winding up/winding down a wire 16 is disposed on the rear side of the turning table 12. The winch 13 rotates in two directions of a winding up direction (winding direction) and a winding down direction (unwinding direction) by rotating a winch motor 64 in the forward direction and the reverse direction.

The boom 14 is configured in a telescopic manner by a proximal end boom 141, an intermediate boom (intermediate booms) 142, and a distal end boom 143, and can be expanded and contracted by a telescopic cylinder 63 disposed inside. A sheave is disposed on a most distal boom head 144 of the distal end boom 143, and the wire 16 is hung on the sheave to suspend a hook 17.

A root portion of the proximal end boom 141 is rotatably attached to a support shaft installed on the turning table 12, and can be raised and lowered vertically about the support shaft as a rotation center. A derricking cylinder 62 is bridged between the turning table 12 and the lower surface of the proximal end boom 141, and the entire boom 14 can be raised by expanding and contracting the derricking cylinder 62.

(Configuration of Control System)

Figure 3:
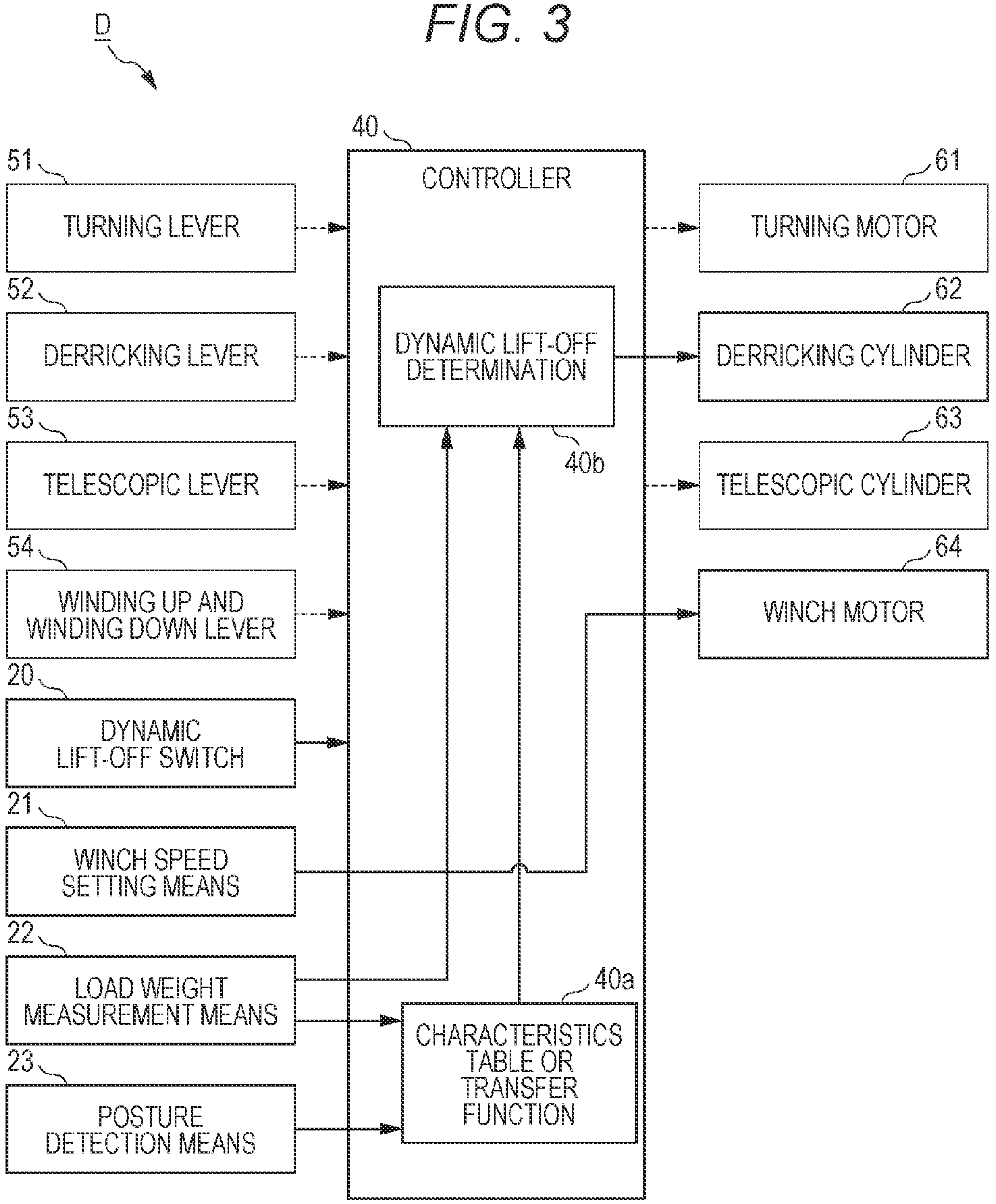
FIG. 3 is a block diagram of a dynamic lift-off control device.

Next, a configuration of a control system of a dynamic lift-off control device D of the present embodiment will be described with reference to a block diagram of FIG. 3. The dynamic lift-off control device D is mainly configured by a controller 40 as a control unit. The controller 40 is a general-purpose microcomputer having an input port, an output port, an arithmetic device, and the like. The controller 40 receives an operation signal from operation levers 51 to 54 (turning lever 51, derricking lever 52, telescopic lever 53, winch lever 54) and controls actuators 61 to 64 (turning motor 61, derricking cylinder 62, telescopic cylinder 63, winch motor 64) via a control valve not illustrated.

The controller 40 of the present embodiment is connected with a dynamic lift-off switch 20 for instructing the start/stop of the dynamic lift-off control, a winch speed setting means 21 for setting the speed of the winch 13 in the dynamic lift-off control, a load weight measurement means 22 for measuring a load weight acting on the boom 14, and a posture detection means 23 for detecting the posture of the boom 14.

The dynamic lift-off switch 20 is an input device for instructing start/stop of dynamic lift-off control, and can be added to a safety device of the rough terrain crane 1, for example, and is preferably disposed on an operator seat 18.

The winch speed setting means 21 is an input device that sets the speed of the winch 13 in the dynamic lift-off control, and is, for example, an input device in which an appropriate speed is selected from preset speeds or an input device in which input is performed with a numeric keypad. As similar to the dynamic lift-off switch 20, the winch speed setting means 21 can be added to the safety device of the rough terrain crane 1, and is preferably disposed on the operator seat 18. The time required for the dynamic lift-off control can be adjusted by adjusting the speed of the winch 13 by the winch speed setting means 21.

The load weight measurement means 22 is a measuring instrument that measures a load weight acting on the boom 14, and for example, a pressure gauge that measures a pressure acting on the derricking cylinder 62 can be applied as the load weight measurement means 22. A pressure signal measured by the pressure gauge is transmitted to the controller 40.

The posture detection means 23 is a measuring instrument that detects the posture of the boom 14, and includes a derricking angle gauge that measures the derricking angle of the boom 14 and a derricking angular velocity meter that measures the derricking angular velocity. Specifically, a potentiometer can be used as the derricking angle gauge. As the derricking angular velocity meter, a stroke sensor attached to the derricking cylinder 15 can be used. A derricking angle signal measured by the derricking angle gauge and a derricking angular velocity signal measured by the derricking angular velocity meter are transmitted to the controller 40.

The controller 40 is a control unit that controls the operations of the boom 14 and the winch 13, and is configured such that, when performing dynamic lift-off of a suspended load by hoisting the winch 13 due to turning on of the dynamic lift-off switch 20, the controller 40 predicts an amount of change in the derricking angle of the boom 14 on the basis of the time change in the load weight measured by the load weight measurement means 22, and raises the boom 14 so as to compensate for the amount of change that has been predicted.

More specifically, the controller 40 includes, as functional units, a selection function unit 40*a* of a characteristics table or transfer function, and a dynamic lift-off determination function unit 40*b* that stops the dynamic lift-off control by determining whether or not the dynamic lift-off has been actually performed.

The selection function unit 40*a* of a characteristics table or transfer function receives inputs of an initial value of the pressure from the pressure gauge as the load weight measurement means 22 and an initial value of the derricking angle from the derricking angle gauge as the posture measurement means 23, and determines the characteristics table or transfer function to be applied. Here, as the transfer function, a relationship using a linear coefficient a can be applied as below.

Figure 8:
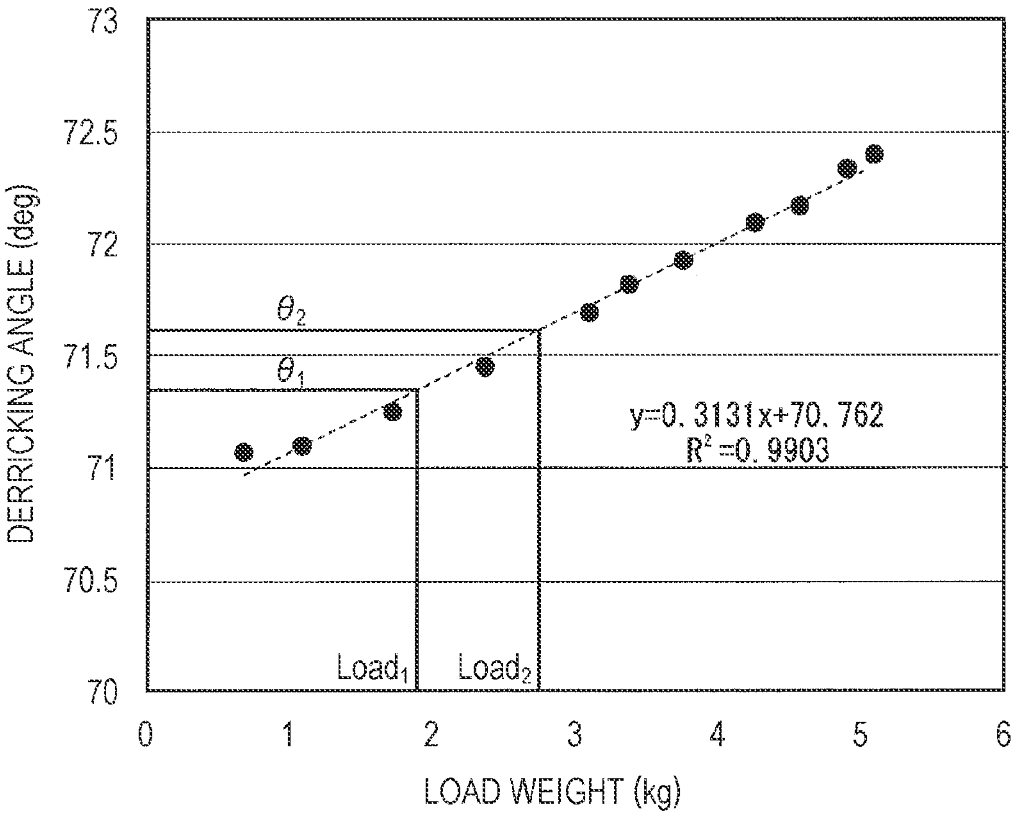
FIG. 8 is a graph illustrating a relationship between a load weight and a derricking angle.

First, as shown in the load weight-derricking angle graph of FIG. 8, it is found that the load weight and the derricking angle (an angle of the distal end to the ground) have a linear relationship when the boom distal end position is adjusted so as to be always directly above the suspended load so as not to cause vibration of the load. Assuming that a load weight $\text{Load}_1$ changes to $\text{Load}_2$ during time from time t1 to time t2 during the dynamic lift-off, derricking angles $\theta_1$, $\theta_2$ at the times t1, t2 are expressed by Equation (1).

[Math. 1]

$$\text{APPROXIMATION EQUATION}\quad \theta = a\cdot\text{Load}+b \qquad (1)$$

$$\left.\begin{aligned} t_1\quad \theta_1 &= a\cdot\text{Load}_1+b\\ t_2\quad \theta_2 &= a\cdot\text{Load}_2+b \end{aligned}\right\}$$

When the difference equation is obtained from the difference between the two equations, a difference $\Delta\theta$ between the derricking angles $\theta_1$, $\theta_2$ is expressed by Equation (2).

[Math. 2]

$$\left.\begin{aligned} \theta_2-\theta_1 &= a(\text{Load}_2-\text{Load}_1)\\ \Delta\theta &= a\cdot\Delta\text{Load} \end{aligned}\right\} \qquad (2)$$

In order to control a derricking angle, a derricking angular velocity is necessary. A derricking angular velocity $V_{Dre}$ is expressed by Equation (3).

[Math. 3]

$$V_{Drv} = \frac{\Delta\theta}{(t_2 - t_1)} = a \cdot \frac{\Delta\text{Load}}{\Delta t} = a \cdot i_{Load} \tag{3}$$

Here, a is a constant (linear coefficient).

That is, in the derricking angle control, the time change (differential) of the load weight is input.

The dynamic lift-off determination function unit 40*b* monitors time-series data of the value of the load weight calculated from the pressure signal from the pressure gauge as the load weight measurement means 22, and determines the presence or absence of dynamic lift-off. A method of the dynamic lift-off determination will be described later with reference to FIG. 7.

(Overall Block Diagram)

Figure 4:
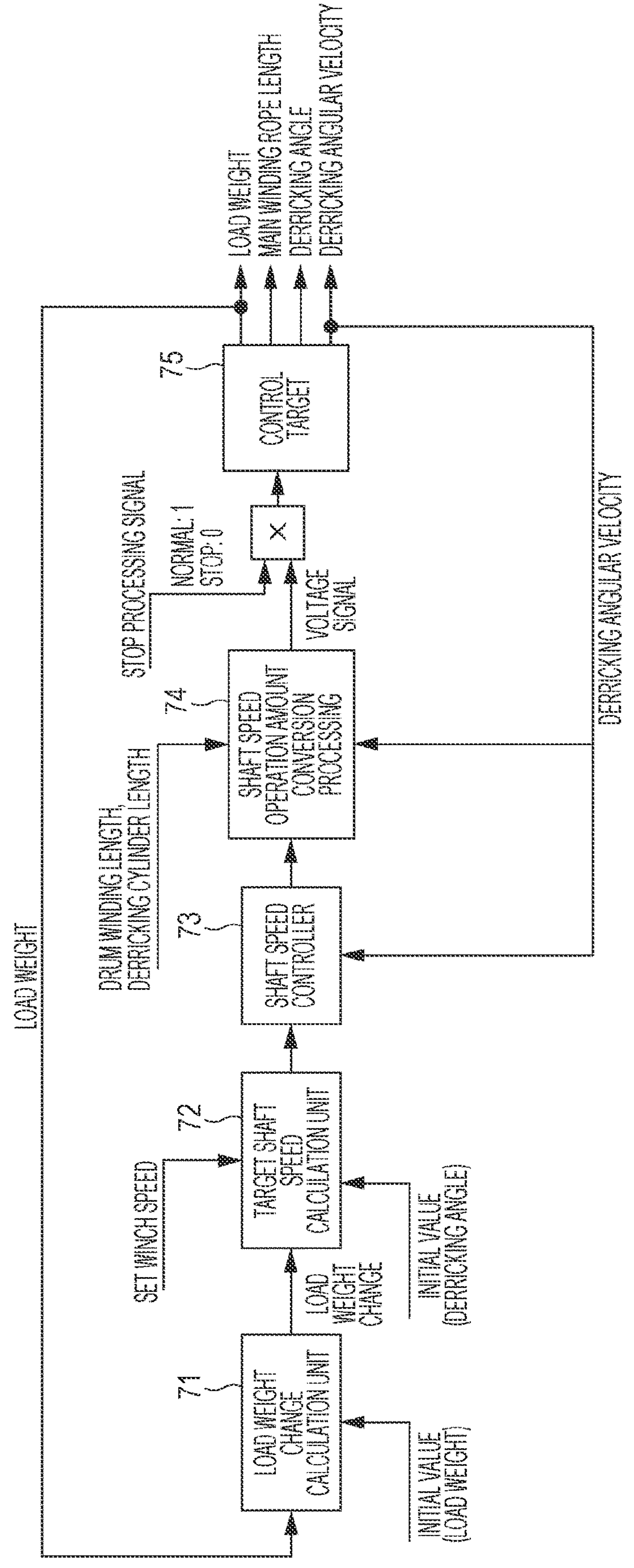
FIG. 4 is a block diagram of the entire dynamic lift-off control device.

Next, with reference to the block diagram of FIG. 4, an input/output relationship among all elements including the dynamic lift-off control of the present embodiment will be described in detail. First, a load weight change calculation unit 71 calculates a load weight change on the basis of time-series data of a load weight measured by the load weight measurement means 22. The calculated load weight change is input to a target shaft speed calculation unit 72. The input/output relationship in the target shaft speed calculation unit 72 will be described later with reference to FIG. 5.

The target shaft speed calculation unit 72 calculates the target shaft speed on the basis of an initial value of the derricking angle, a set winch speed, and a load weight change that has been input. Here, the target shaft speed is a target derricking angular velocity (and, although not required, a target winch speed). The calculated target shaft speed is input to a shaft speed controller 73.

The control of the first half up to here is processing related to the dynamic lift-off control of the present embodiment.

Thereafter, the operation amount is input to a control target 75 via the shaft speed controller 73 and a shaft speed operation amount conversion processing unit 74. The control of the latter half is processing related to normal control, and is feedback-controlled on the basis of the measured derricking angular velocity.

(Block Diagram of Dynamic Lift-Off Control)

Figure 5:
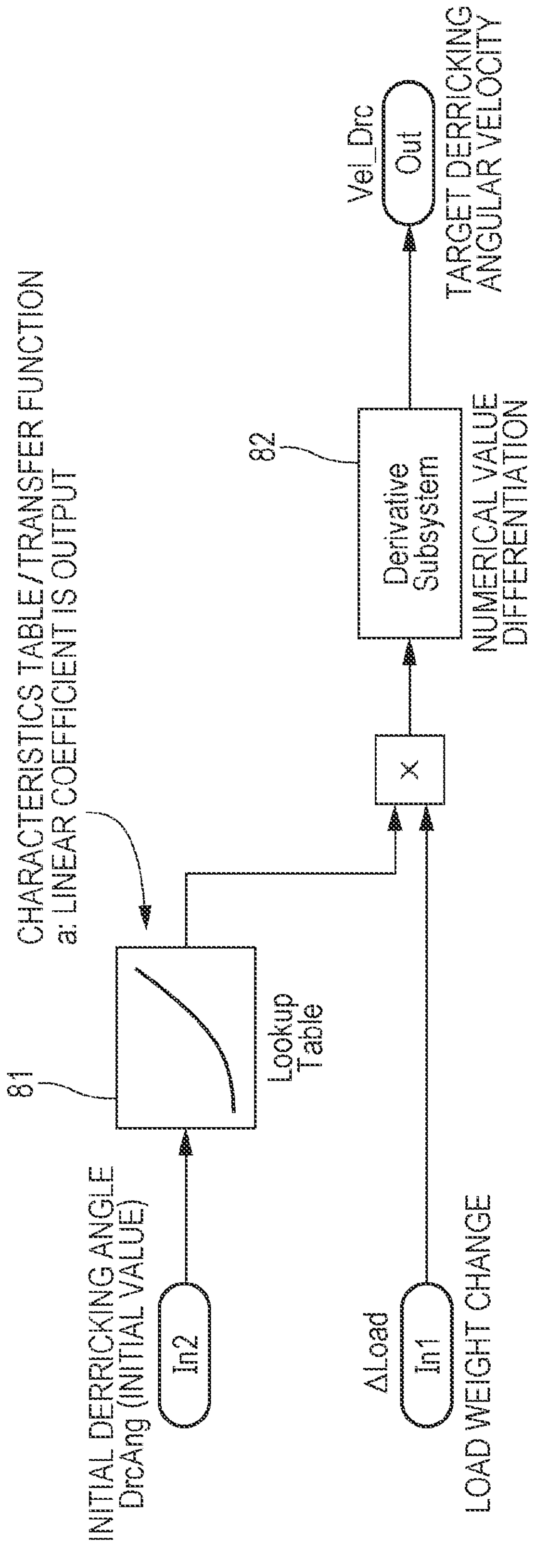
FIG. 5 is a block diagram of dynamic lift-off control.

Next, an input/output relationship of elements in the target shaft speed calculation unit 72 of the dynamic lift-off control in particular will be described with reference to the block diagram of FIG. 5. First, an initial value of the derricking angle is input to the selection function unit 81 (40*a*) of the characteristics table/transfer function.

In the selection function unit 81, the most appropriate constant (linear coefficient) a is selected using a characteristics table (LookupTable) or a transfer function.

Then, numerical differentiation (differentiation with respect to time) of the load weight change is performed in a numerical differentiation unit 82, and by multiplying the result of the numerical differentiation by the constant a, the target derricking angular velocity is calculated. That is, the target derricking angular velocity is calculated by executing the calculation of (Equation 3) described above. As described above, the control of the target derricking angular velocity is feedforward controlled using the characteristics table (or the transfer function).

(Flowchart)

Figure 6:
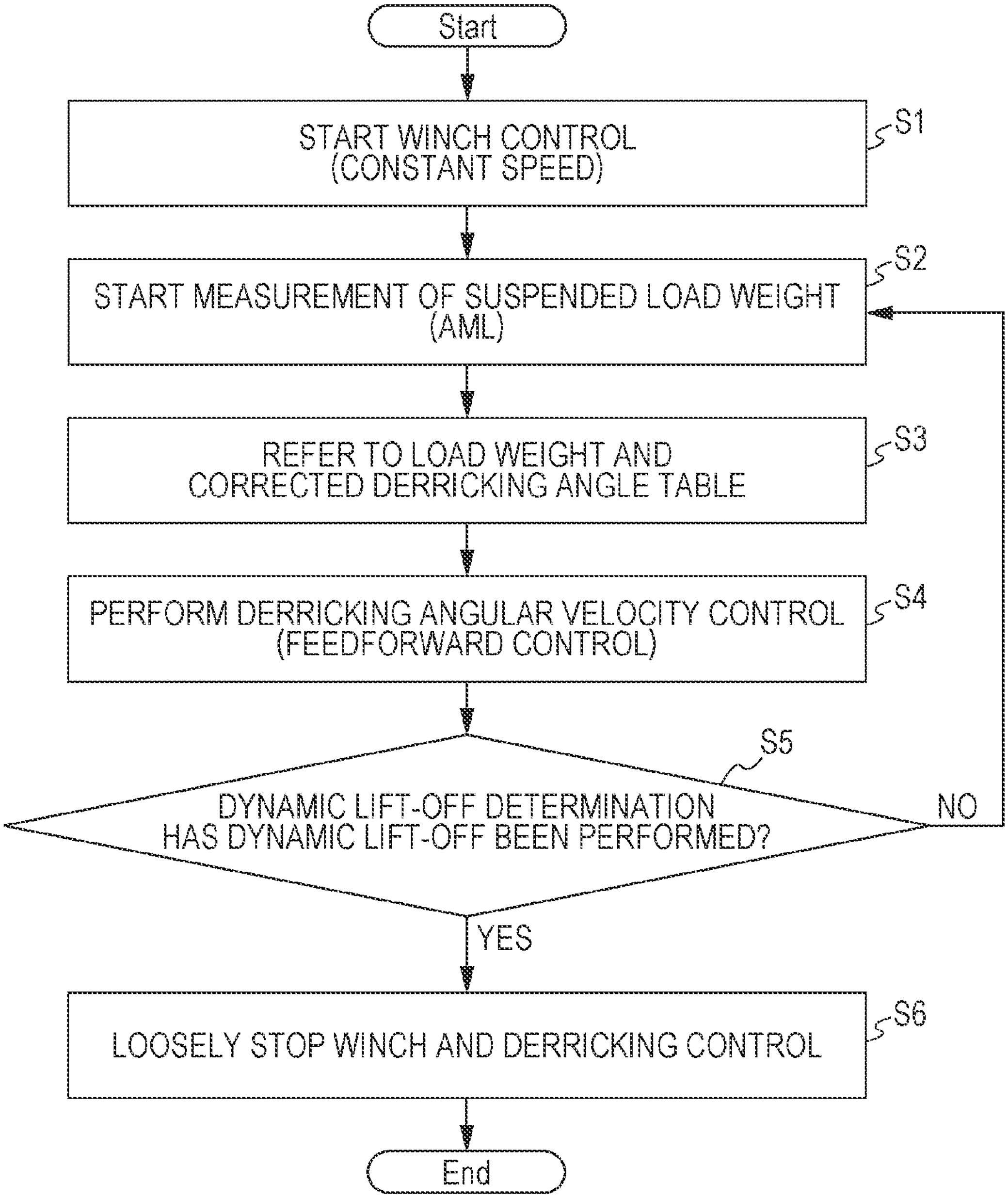
FIG. 6 is a flowchart of the dynamic lift-off control.

Next, the overall flow of the dynamic lift-off control of the present embodiment will be described with reference to the flowchart of FIG. 6.

First, an operator presses the dynamic lift-off switch 20 to start the dynamic lift-off control (Start). At this time, the target speed of the winch 13 is set in advance before or after the start of the dynamic lift-off control via the winch speed setting means 21. Then, the controller 40 starts winch control at the target speed (Step S1).

Next, at the same time as the winch 13 is wound up, the suspended load weight measurement is started by the load weight measurement means 22, and a load weight value is input to the controller 40 (Step S2). Then, the selection function unit 40*a* receives inputs of an initial value of the load weight and an initial value of the derricking angle from the derricking angle gauge 23 as the posture measurement means, and the characteristics table or transfer function to be applied is determined (Step S3).

Next, the controller 40 calculates the derricking angular velocity on the basis of the applied characteristics table or transfer function and the load weight change (Step S4). That is, the derricking angular velocity control is performed by the feedforward control.

Then, the controller 40 determines the presence or absence of dynamic lift-off on the basis of the time-series data of the measured load weight (Step S5). The determination method will be described later. As a result of the determination, when the dynamic lift-off has not been performed (NO in Step S5), the process returns to Step S2, and the controller 40 repeats the feedforward control based on the load weight (Steps S2 to S5).

As a result of the determination, when the dynamic lift-off is performed (YES in Step S5), the controller 40 loosely stops the dynamic lift-off (Step S6). That is, the rotational driving of the winch 13 by the winch motor is stopped while reducing the speed, and the derricking driving by the derricking cylinder 62 is stopped while reducing the speed.

(Dynamic Lift-Off Determination)

Next, a method of the dynamic lift-off determination of the present embodiment will be described using the graph of FIG. 7. In the present embodiment, the controller 40 monitors time-series data of the measured load weight while the winch 13 is wound up in the dynamic lift-off control, and determines that the dynamic lift-off has been performed by capturing the first maximum value of the time-series data.

Figure 7:
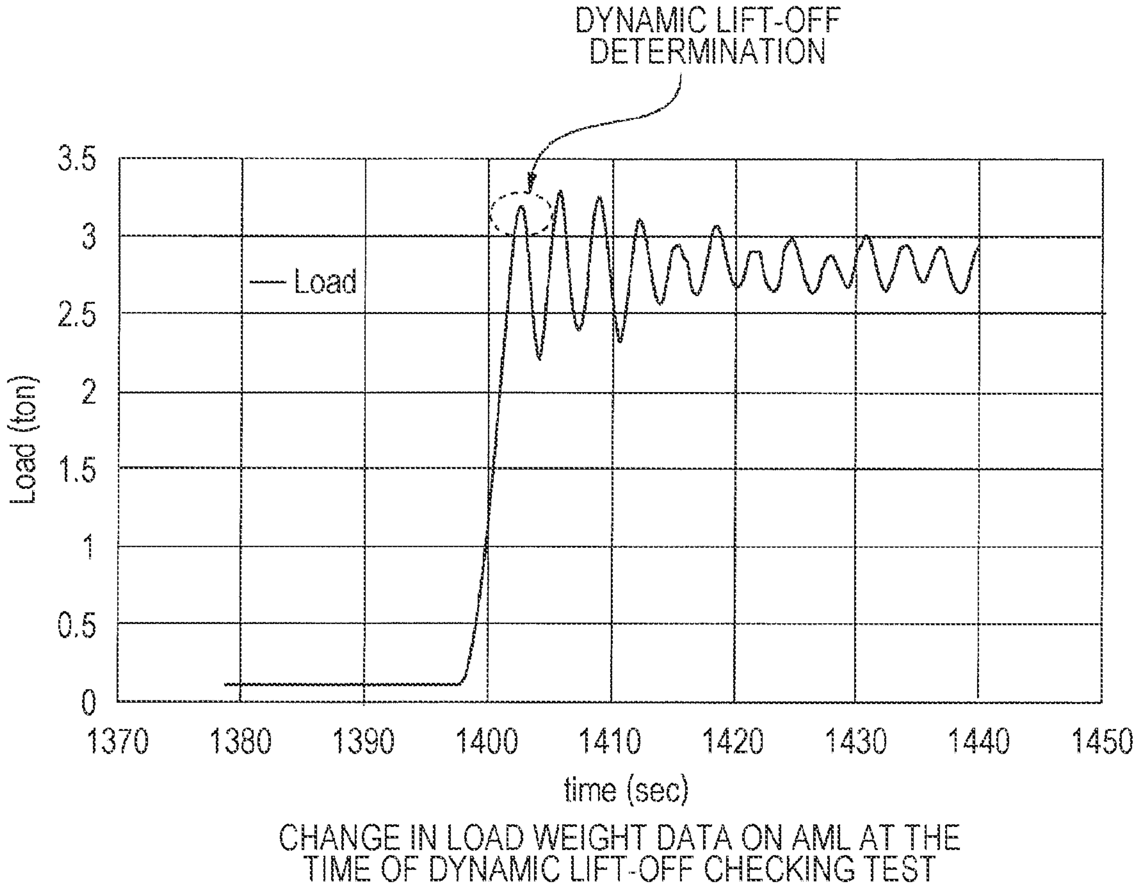
FIG. 7 is a graph for explaining a method of dynamic lift-off determination.

More specifically, as illustrated in FIG. 7, in general, when taking a time series of load weight data, the load weight data overshoots at the next moment after the dynamic lift-off, undershoots further, and then transitions to continue to vibrate. Therefore, it is possible to determine that the dynamic lift-off has been performed by capturing the time of the peak of the first peak of vibration, that is, the first maximum value. However, actually, at the time when the first maximum value is recorded, which is the time when it is determined that the dynamic lift-off is performed, it is considered that the load weight data slightly overshoots due to the inertial force.

(Effect)

Next, effects of a dynamic lift-off control device D of the present embodiment will be listed and described.

(1) As described above, the dynamic lift-off control device D of the present embodiment includes the boom 14, the winch 13, the load weight measurement means 22, and the controller 40 as a control unit that controls the operation of the boom 14 and the winch 13, derives the change amount of the derricking angle of the boom 14 on the basis of the time change of the measured load weight when dynamic lift-off of the suspended load is performed by hoisting the winch 13, and raises the boom 14 to compensate for the amount of change. According to the dynamic lift-off control device D, it is possible to quickly perform dynamic lift-off of the suspended load while suppressing vibration of the load.

That is, in the dynamic lift-off control device D of the present embodiment, focusing on the linear relationship between the load weight and the derricking angle, the dynamic lift-off of the suspended load can be quickly performed by performing the feedforward control on the basis of only the time change of the load weight value without performing the complicated feedback control as in the conventional case.

(2) It is preferable that the dynamic lift-off control device D of the present embodiment further includes the posture measurement means 23 that measures the posture of the boom 14, and the controller 40 selects a corresponding characteristics table or transfer function on the basis of the initial value (initial value of the posture) of the measured derricking angle of the boom 14 and the initial value of the measured load weight, and derives the amount of change of the derricking angle of the boom 14 from the time change of the measured load weight using the characteristics table or transfer function.

With this configuration, at the start of the dynamic lift-off control, the winch 13 is wound up at a constant speed, and the derricking angle control amount is calculated from the characteristics table (or the transfer function) in accordance with the load weight change to perform the feedforward control, so that the dynamic lift-off can be promptly performed without vibration of the load. In addition, since the number of parameters to be adjusted is reduced, adjustment at the time of shipment can be quickly and easily performed.

(3) It is preferable that the controller 40 controls the winch 13 to wind up the winch 13 at a constant speed when the winch 13 is wound up and dynamic lift-off of the suspended load is performed.

With this configuration, the influence of the disturbance such as the inertial force is suppressed, and the response (measured load weight value) is stabilized, so that the dynamic lift-off determination can be easily performed.

(4) The controller 40 preferably adjusts the time required for dynamic lift-off by adjusting the speed of the winch 13 when dynamic lift-off of the suspended load is performed by hoisting the winch 13. With this configuration, it is possible to work safely and efficiently by selecting an appropriate speed of the winch 13 according to the weight of the suspended load and the environmental conditions.

(5) The controller 40 of the present embodiment monitors time-series data of the measured load weight when dynamic lift-off of the suspended load is performed by hoisting the winch 13, and determines that the dynamic lift-off has been performed by capturing the first maximum value of the time-series data. By performing the control based only on the load weight in this manner, it is possible to easily and quickly determine dynamic lift-off.

(6) Since the rough terrain crane 1 which is the mobile crane of the present embodiment includes any of the above-described dynamic lift-off control devices D, it is possible to quickly perform dynamic lift-off of the suspended load while suppressing vibration of the load, and the crane operation can be performed safely and efficiently.

Although the embodiments of the present invention have been described in detail with reference to the drawings, the specific configuration is not limited to the embodiments, and a design change that does not depart from the gist of the present invention is included in the present invention.

For example, although not specifically described in the embodiment, the dynamic lift-off control device D of the present invention can be applied to both the case of performing the dynamic lift-off using the main winch as the winch 13 and the case of performing the dynamic lift-off using a sub winch.

The disclosure content of the specification, drawings and abstract included in the Japanese application of JP 2019-024610 A filed on Feb. 14, 2019 is incorporated herein by reference in its entirety.

REFERENCE SIGNS LIST

D dynamic lift-off control device
a linear coefficient
1 rough terrain crane
10 vehicle body
12 turning table
13 winch
14 boom
16 wire
17 hook
20 dynamic lift-off switch
21 winch speed setting means
22 load weight measurement means
23 posture detection means
40 controller
**40*a*** selection function unit
**40*b*** dynamic lift-off determination function unit
51 turning lever
52 derricking lever
53 telescopic lever
54 winch lever
61 turning motor
62 derricking cylinder
63 telescopic cylinder
64 winch motor

The invention claimed is:

1. A dynamic lift-off control device comprising:

a boom configured to be freely raised and lowered;

a winch configured to wind up and wind down a suspended load via a wire;

a load weight measurement instrument configured to measure a load weight acting on the boom; and a control unit configured to control operations of the boom and the winch, wherein when performing dynamic lift-off of the suspended load by hoisting the winch, the control unit is further configured to calculate a derricking angular velocity of the boom based on a time change in the load weight that has been measured, predict an amount of change in a derricking angle of the boom in the future based on the derricking angular velocity, and perform feedforward control of a raising operation of the boom so as to compensate for the amount of change, and the control unit is implemented via at least one processor.

2. The dynamic lift-off control device according to claim 1, further comprising a posture measurement instrument configured to measure a posture of the boom, wherein the control unit is further configured to
select a corresponding characteristics table or transfer function based on an initial value of the posture of the boom that has been measured and an initial value of the load weight that has been measured, and
predict the amount of change of the derricking angle of the boom from the time change of the load weight that has been measured, using the characteristics table or transfer function.

3. The dynamic lift-off control device according to claim 1, wherein the control unit is further configured to control the winch to be hoisted up at a constant speed when performing the dynamic lift-off of the suspended load by hoisting the winch.

4. The dynamic lift-off control device according to claim 1, wherein the control unit is further configured to adjust a time required for the dynamic lift-off by adjusting a speed of the winch when performing the dynamic lift-off of the suspended load by hoisting the winch.

5. The dynamic lift-off control device according to claim 1, wherein the control unit is further configured to
monitor time-series data of the load weight that has been measured, when performing the dynamic lift-off of the suspended load by hoisting the winch, and
determine that the dynamic lift-off has been performed by capturing a first maximum value of the time-series data.

6. A crane comprising the dynamic lift-off control device according to claim 1.

* * * * *